(12) United States Patent
Song et al.

(10) Patent No.: US 6,732,826 B2
(45) Date of Patent: May 11, 2004

(54) ROBOT CLEANER, ROBOT CLEANING SYSTEM AND METHOD FOR CONTROLLING SAME

(75) Inventors: Jeong-gon Song, Gwangju (KR); Jang-youn Ko, Gwangju (KR); Seung-bin Moon, Suwon (KR); Kyoung-mu Lee, Seoul (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 36 days.

(21) Appl. No.: 10/116,187

(22) Filed: Apr. 4, 2002

(65) Prior Publication Data

US 2002/0153184 A1 Oct. 24, 2002

(30) Foreign Application Priority Data

Apr. 18, 2001 (KR) ................. 10-2001-0020754
Oct. 25, 2001 (KR) ................. 10-2001-0065888

(51) Int. Cl.⁷ ................................ B60T 7/16
(52) U.S. Cl. ..................... 180/169; 701/28; 901/1; 15/340.1
(58) Field of Search ................ 180/167, 168, 180/169; 701/23, 24, 25, 26, 27, 28, 201, 202, 207, 36; 901/1, 50; 15/340.1; 700/245, 246, 247, 257; 318/587

(56) References Cited

U.S. PATENT DOCUMENTS

| | | | |
|---|---|---|---|
| 4,674,048 A | * | 6/1987 | Okumura ................. 701/25 |
| 4,790,402 A | * | 12/1988 | Field et al. ............. 180/169 |
| 4,933,864 A | * | 6/1990 | Evans, Jr. et al. ......... 701/207 |
| 4,947,094 A | * | 8/1990 | Dyer et al. ............. 318/587 |
| 5,051,906 A | | 9/1991 | Evans, Jr. et al. |
| 5,155,684 A | | 10/1992 | Burke et al. |
| 5,440,216 A | | 8/1995 | Kim |
| 5,525,883 A | | 6/1996 | Avitzour |
| 5,530,330 A | * | 6/1996 | Baiden et al. ............. 318/580 |
| 5,999,865 A | * | 12/1999 | Bloomquist et al. ......... 701/25 |
| 6,009,359 A | * | 12/1999 | El-Hakim et al. .......... 701/28 |
| 6,079,285 A | * | 6/2000 | Baker et al. ............. 73/865.8 |
| 6,292,713 B1 | * | 9/2001 | Jouppi et al. ............. 700/245 |
| 6,349,249 B1 | * | 2/2002 | Cunningham ............. 701/28 |
| 6,459,955 B1 | * | 10/2002 | Bartsch et al. ........... 700/245 |
| 6,496,754 B2 | * | 12/2002 | Song et al. .............. 700/245 |
| 6,616,244 B2 | * | 9/2003 | Hakkinen .............. 299/1.05 |
| 6,697,147 B2 | * | 2/2004 | Ko et al. ................ 356/4.03 |
| 2004/0016077 A1 | * | 1/2004 | Song et al. ............... 15/319 |

FOREIGN PATENT DOCUMENTS

| | | |
|---|---|---|
| DE | 4340771 | 12/1994 |
| DE | 4429016 | 2/1996 |
| EP | 0364353 | 4/1990 |
| EP | 0952427 | 10/1999 |

* cited by examiner

*Primary Examiner*—Bryan Fischmann
(74) *Attorney, Agent, or Firm*—Ladas & Parry

(57) ABSTRACT

A robot cleaner, robot cleaning system, and a method for controlling the same, using wireless communications an upwardly-looking camera for photographing an upper image perpendicular to a forward-looking direction of driving the robot cleaner; and a controller for controlling the driving unit to allow the robot cleaner to drive within a cleaning area according to a predetermined driving path, and compensating the driving path by analyzing the image photographed by the upwardly-looking camera. Optional features include second forwardly directed camera to provide a three dimensional image sensors for sensing walls or obstacles and transmission of data to external processor/controllers by a radio antenna. The inventive system can recognize the robot cleaner position more accurately by using a relatively constant upper image reducing movement error to a target position.

12 Claims, 8 Drawing Sheets

ROBOT CLEANER, ROBOT CLEANING SYSTEM AND METHOD FOR CONTROLLING SAME

BACKGROUND OF THE INVENTION

1. Field of the Invention

The present invention relates generally to a robot cleaner, a robot cleaning system, and a method for controlling the same, and more particularly, to a robot cleaner, a robot cleaning system, and a method for controlling the same that is capable of controlling the driving mechanism of the robot cleaner by using an upper image photographed while the robot cleaner is driving.

2. Description of the Related Art

A general robot cleaner determines the extent of a cleaning area by driving an outer track of the cleaning area that is surrounded by a wall or an obstacle by using an ultrasonic sensor disposed on a main body, and plans a cleaning path to clean the determined cleaning area. After that, the robot cleaner drives wheels to run the planned cleaning path by calculating a driving distance and a current position from a signal detected through a sensor for sensing the degree of rotation of the wheels and their rotation angle. However, the above generally used method for recognizing the position produces an error between the driving distance and the moved position calculated from the signal by the sensor and the real driving distance and the position that may be caused by the slip of the wheels and/or the bend of a floor while the robot cleaner is driving along a cleaning path. The more the cleaner drives, the more the position recognition errors may accumulate. Accordingly, the cleaner driven by the accumulated position recognition error can deviate significantly from the planned cleaning path. Consequently, some area might not be cleaned, and the cleaner can perform cleaning several times for other areas. Accordingly, cleaning efficiency and precision can diminish.

SUMMARY OF THE INVENTION

An object of the present invention is to provide a robot cleaner, a robot cleaning system, and a method for controlling the robot capable of effectively performing a commanded cleaning by compensating to correct error in a computed driving track, and for precisely recognizing the current position of the robot cleaner.

The above object is accomplished by providing a robot cleaner that comprises: a driving unit for driving a plurality of wheels; an upper camera disposed on a main body in order to photograph an upper image perpendicular to a direction of driving of the robot cleaner; and a controller for controlling the driving unit to allow the robot cleaner to drive within a cleaning area defined by a predetermined driving pattern, and compensating the driving path when needed by analyzing the image photographed by the upper camera.

It is preferable that the controller controls the driving unit to drive within the cleaning area defined by the predetermined driving pattern and creates and stores an image map in regard to the upper area from the image photographed by the upper camera, when operating a mode for mapping a cleaning area. In addition, the controller recognizes the position of the robot cleaner by comparing the stored image map and a current image input from the upper camera, so as to enable the control of the driving unit corresponding to a target driving path from a recognized position.

Moreover, the controller creates the image map when a signal for cleaning is transmitted.

It is preferable that a front camera is disposed on the main body for photographing an image opposite to the direction of driving of the robot cleaner. The controller creates the image map by three-dimensionally mapping the upper image photographed from the upper camera and the front image photographed by the front camera.

The controller may divide the image map into a plurality of small cells, each cell having a predetermined size, may determine a special feature on one or more of the divided small cells, and set up the determined special feature as a standard coordinate point for recognizing the position of the robot cleaner. The special feature includes at least one element taken from a bulb, a fire sensor, a fluorescent lamp, and a speaker.

The controller extracts a linear element from the image photographed from the upper camera while the robot cleaner is driving, and may compensate the driving path by using the extracted linear element.

To accomplish the above object, the robot cleaning system includes: a driving unit for driving a plurality of wheels; a robot cleaner having an upper camera disposed on a main body for photographing an upper image perpendicular to a driving direction; and a remote controller for wirelessly communicating with the robot cleaner. The remote controller controls the robot cleaner to drive within a cleaning area defined by a predetermined driving pattern, and may compensate the driving path by analyzing the image transmitted after being photographed by the upper camera.

It is preferable that the remote controller controls the robot cleaner to drive within the cleaning area defined by the predetermined driving pattern and creates an image map in regard to the upper area from the image photographed by the upper camera, when operating a mode for mapping a cleaning area. In addition, the remote controller recognizes the position of the robot cleaner by comparing the stored image map and a current image transmitted from the robot cleaner after being photographed from the upper camera and controls a cleaning path of the robot cleaner to perform the desired target work from a recognized position, after receiving a signal for cleaning.

It is advisable that the remote controller creates the image map at the start of the cleaning operation and before a signal for cleaning is transmitted.

A front camera is disposed on the main body in order to photograph a front image as viewed in a direction parallel to the direction of driving of the robot cleaner. Moreover, the remote controller creates the image map by three-dimensionally mapping the upper image and the front image transmitted from the robot cleaner after being photographed from the upper camera and the front camera, respectively.

It is recommended that the remote controller extracts a linear element from the image transmitted after being photographed from the upper camera and arranges a driving track by using the extracted linear element, when controlling the driving of the robot cleaner.

To accomplish the above object, the method for controlling the robot cleaner according to the present invention comprises the steps of: creating and storing an image map of an upper area located above an area to be cleaned, form an image photographed by the upper camera by driving the robot cleaner according to a predetermined driving pattern within a cleaning area; recognizing a position of the robot cleaner by comparing an image of the recorded image map and a current image photographed from the upper camera, and calculating a driving path from the recognized position to a target position, upon receiving a signal for cleaning; and driving the robot cleaner according to the calculated driving path.

According to another aspect of the present invention, the method for controlling the robot cleaner comprises the steps of: creating a cleaning area map by driving the robot cleaner within a cleaning area and storing the map; calculating a driving path corresponding to a cleaning command, upon receiving a signal for cleaning; driving the robot cleaner according to the calculated driving path; and arranging the driving path by analyzing an image photographed from the upper camera.

It is preferable that the driving path arranging step extracts a linear element from the image photographed from the upper camera, and arranges the driving path by using the extracted linear element.

BRIEF DESCRIPTION OF THE DRAWINGS

The objects and the features of the present invention will become more apparent by describing the preferred embodiments of the present invention having reference to the appended drawings, in which.

DETAILED DESCRIPTION OF THE PREFERRED EMBODIMENTS

Hereinbelow, the preferred embodiments of the present invention will be described in greater detail having reference to the appended drawings.

Figure 1:
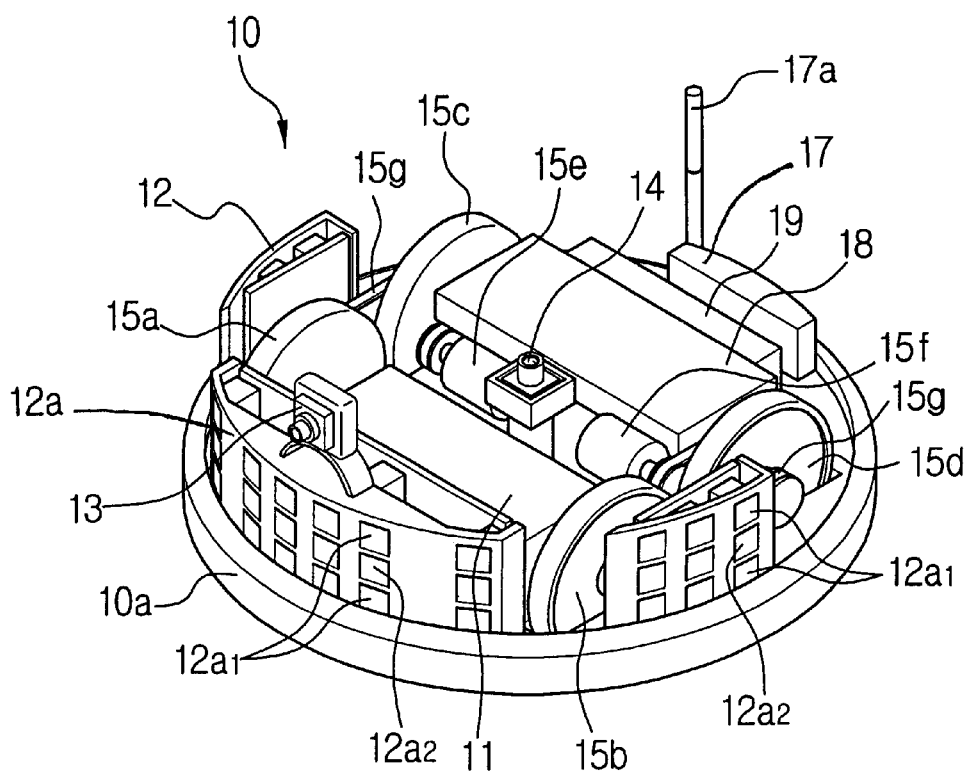
FIG. 1 is a perspective view showing a robot cleaner according to the present invention in which a cover has been separated from the cleaner.
Figure 2:
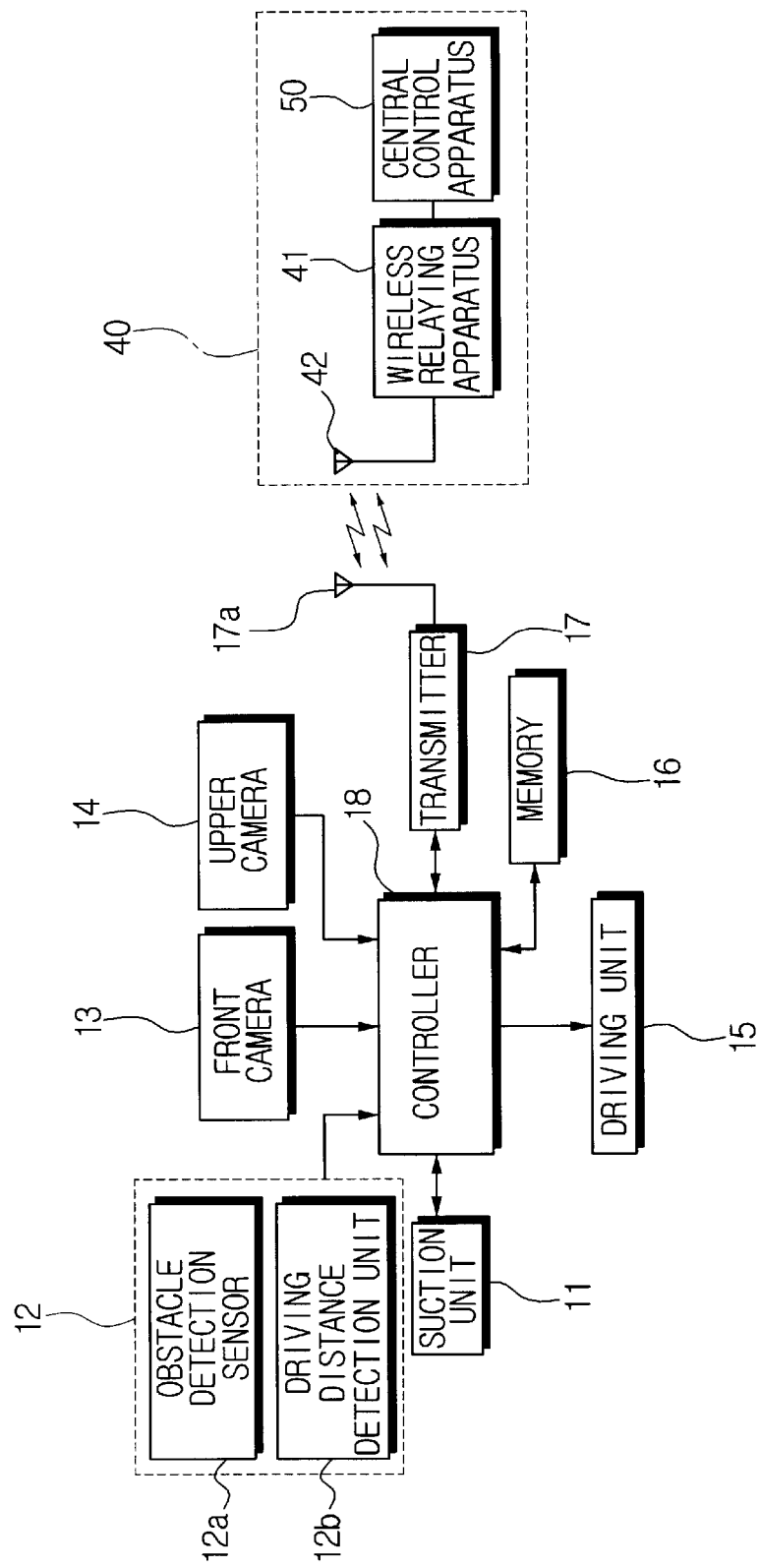
FIG. 2 is a schematic block diagram showing the robot cleaning system according to the present invention.

Referring to FIGS. 1 and 2, a robot cleaner 10 comprises a suction unit 11, a sensing unit 12, a front camera 13, an upper camera 14, a driving unit 15, comprising driving unit elements 15a to 15g (FIG. 1), a memory 16 (FIG. 2), a transmitter 17, and a controller 18. The power source may comprise a battery 19.

The suction unit 11 is installed on a main body 10a in order to collect dust on an opposing floor while drawing in air. The suction unit 11 can be constructed using well-known methods. As one example, the suction unit 11 has a suction motor (not shown), and a suction chamber, for collecting the air drawn in through a suction hole or a suction pipe formed opposite to the floor by driving of the suction motor.

The sensing unit 12 sends a signal to commence the process of sensing the environment outside of the robot 10 cleaner. The sensing unit 12 comprises an obstacle detection sensor 12a disposed at a side circumference of the body 10a separated by predetermined intervals in order to receive a reflected signal, and a driving distance detection sensor 12b for measuring distances driven by the robot 10 cleaner.

The obstacle detection sensor 12a has a plurality of infrared ray luminous elements 12a1 for projecting infrared rays and light-receiving elements 12a2 for receiving infrared rays. The infrared ray luminous elements 12a1 and receiving elements 12a2 are disposed along an outer circumference of the obstacle detection sensor 12a by perpendicularly arranged pairs. On the other hand, the obstacle detection sensor 12a can adopt an ultrasonic sensor capable of projecting an ultrasound and receiving a reflected ultrasound. The obstacle detection sensor 12a is also used for measuring the distance between the robot cleaner and an obstacle or an adjacent wall.

The driving distance detection sensor 12b (FIG. 2) computes data received from a rotation detection sensor for detecting the degree or amount of rotation of wheels 15a through 15d. For example, the rotation detection sensor can adopt an encoder for detecting the degree of rotation of motors 15e, 15f, respectively.

The front camera 13 is disposed on the main body 10a is directed in the direction of travel in order to photograph a front image, and outputs the photographed image to the controller 18.

The upper camera 14 is disposed on the main body 10a and directly upwardly in order to photograph an upper image, and outputs the photographed image to the controller 18.

The driving unit 15 comprises: two wheels 15a, 15b disposed at both sides of the front of body 10a; two wheels 15c, 15d disposed at both sides of the back of body 10a; motors 15e, 15f for respectively rotating the back wheels 15c, 15d; and a timing belt 15g for transmitting power generated by the motors 15e, 15f to the back wheels 15c, 15d also to the front wheels 15a, 15b. The driving unit 15 independently rotates the motors 15e, 15f in a forward or an inverse direction in accordance with control signals received from the controller 18. The angular rotation of the robot 10 can be performed by driving the motors 15e, 15f with different speeds of rotation or in opposite directions. The transmitter 17 sends target data through an antenna 17a, and transmits a signal received by the transmitter 17, through the antenna 17a, to the controller 18.

The controller 18 processes the signal received by the transmitter 17, and controls each of the elements. The controller 18 processes a key signal input from a key input apparatus, when the key input apparatus having a plurality of keys for manipulating to set-up functions of an apparatus is further provided on the main body 10a.

The controller 18 develops or arranges a driving path for the robot cleaner 10 by analyzing the image photographed by the upper camera 14 as the controller 18 controls the driving unit 15 to drive within a cleaning area according to a driving pattern determined by the command for cleaning.

According to a first aspect of the present invention, the controller 18 creates an image map in regard to an upper area of the cleaning area, such as a ceiling, from the image photographed by the upper camera 14 by controlling the driving unit 15 to drive the robot cleaner 10 within the cleaning area in accordance with a predetermined driving pattern for creating the map. The controller then stores the created image map into the memory 16, when a mode for creating the image map is set up. The controller 18 can be set up to perform the mode for creating the image map when a signal is received commanding performance of the mode for creating the image map by an external wireless input or from the key input apparatus. Alternatively, the controller 18 can be set up to perform the mode for creating the image map before performing any cleaning operations, when the command for cleaning is wirelessly transmitted from the outside or the key input apparatus to the robot 10.

The controller 18 controls the driving unit 15 in accordance with the driving pattern set up by the controller so as to photograph the cleaning area. Generally, the cleaning area is surrounded by an obstacle or a wall, and may define an entire room by dividing the room with reference to the data received from the upper camera 14, when operating the mode for creating the image map. As an example of the driving pattern, the controller 18 advances the robot cleaner 10 forward from a current position, and when a wall or obstacle is detected by the obstacle sensor 12a, sets up the current position as an initial position. After that, the controller 18 controls the driving unit 15 to drive the robot cleaner 10 until the robot cleaner 10 returns to its initial position by driving along the wall, thereby creating an image of a room outline or boundary.

Figure 5:
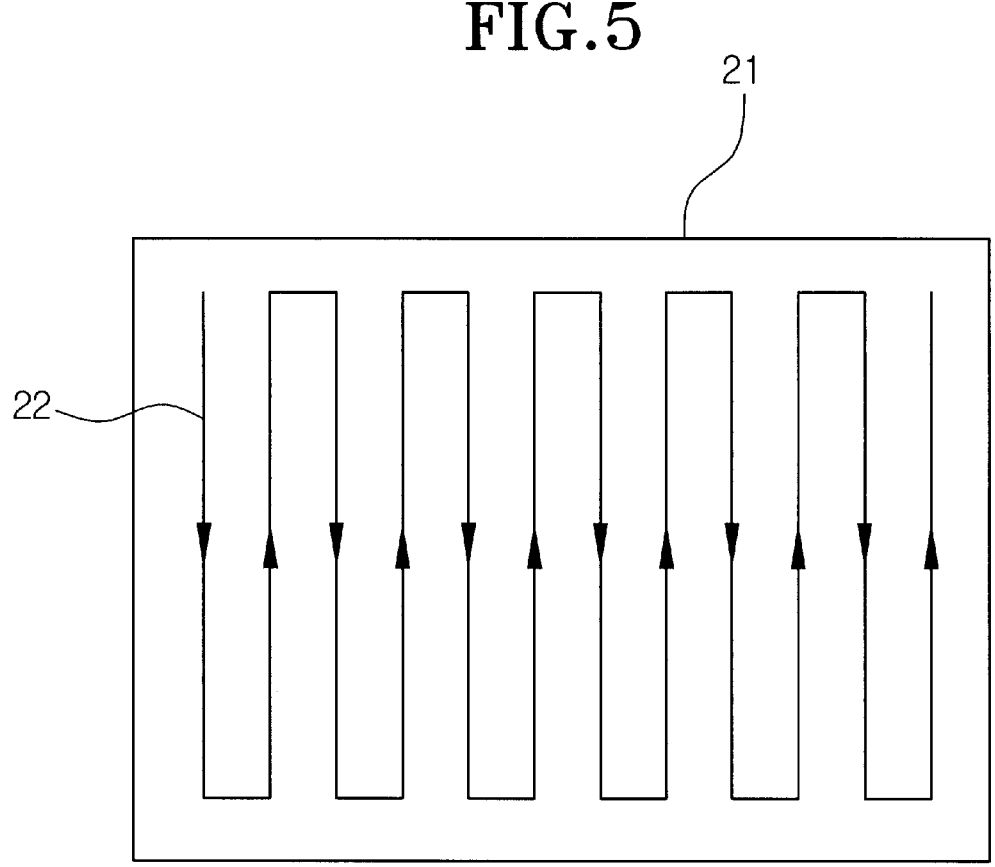
FIG. 5 is a view showing an exemplary track that the robot cleaner may drive in the room, such as that shown in FIG. 4.

Then, the controller 18 drives the robot cleaner 10 within the area determined by the room outline along driving lines or legs separated by regular intervals. In other words, the controller 18 controls the driving unit 15 to drive the robot cleaner 10 along the driving line 22 planned with respect to the cleaning area 21 determined, as shown in FIG. 5.

At this time, the interval separating the legs of the driving line 22 is determined to allow the upper images photographed by camera 14 to be consecutive. The upper image is photographed while the robot cleaner 10 is moving along the driving line 22. Moreover, it is preferable that the photographing cycle is determined to provide frames having an overlap of about 10% to 20% with the adjacent image of the upper images photographed or extracted while moving along an adjacent leg of line 22. The method for determining the photographing cycle can initially be done through a plurality of images photographed for several times. Alternatively, the photographing cycle may be set up in advance by considering an angle of vision of the upper camera 14 and the distance from the floor to ceiling in a normal room, and then the photographing can be done by a predetermined photographing cycle.

Figure 4:
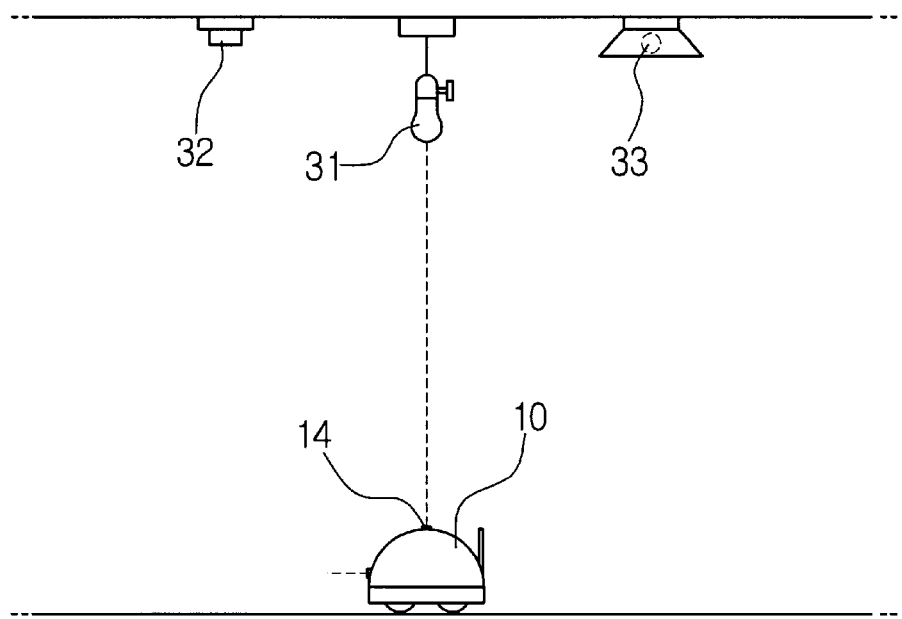
FIG. 4 is a view showing the status in which the robot cleaner of FIG. 1 is placed in a room.
Figure 6:
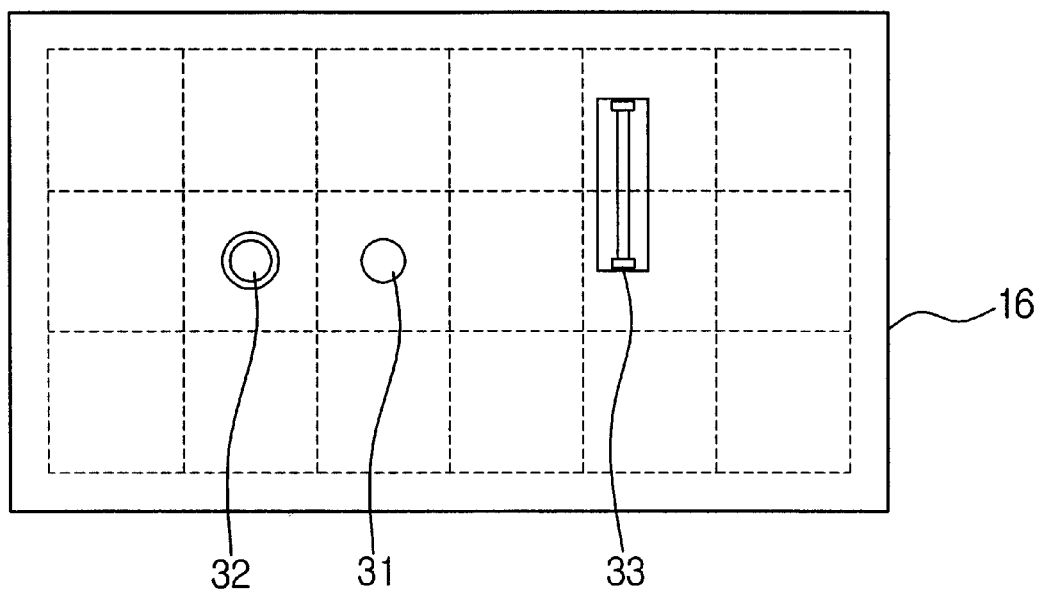
FIG. 6 is a "plan" view showing one example of an image map created by mapping an image photographed along the driving track shown in FIG. 5.

The image photographed from the upper camera 14 during the driving process is stored in the memory 16 as the upper image map shown in FIG. 6. The stored image may include elements, as determined by the control program of the controller 18, when elements such as a bulb 31, a fire sensor 32, and a fluorescent lamp 33, shown in FIG. 4, are photographed as being installed on the ceiling.

Preferably, the controller 18 divides the image map stored in the memory 16 into several cells, as shown in FIG. 6. In addition, the controller 18 performs an image process for setting up one or more special features as standard coordinate points for recognizing the position so as to easily determine the position of the robot cleaner 10 by extracting the special feature among the images corresponding to each of the cells. For example, the bulb 31, the fire sensor 32, and the direct-light fluorescent lamp 33, shown in FIG. 4, may be determined as the special features for the image processing method in regard to the image photographed for the corresponding elements 31, 32, 33 shown in of FIG. 6.

The image processing method for extracting the special features from the photographed image can adopt well-known methods. For example, a method can be adopted using an algorithm that processes a coordinate point calculated by connecting pixel points having similar values, such as the special features, after converting the photographed image into a gray level. Moreover, an image area having a similar distribution as does the recorded data value can be determined as matching a corresponding special feature, after image data having a distribution type in regard to the special features are first stored in the memory 16.

According to a second aspect of the present invention, the controller 18 creates an image map by three-dimensionally mapping the front image photographed from the front camera 13 and the upper image photographed from the upper camera 14 and stores the created image map into the memory 16. When the three-dimensional image map is created and used, the accuracy of the position recognition can be improved. In this case, it is preferable that the position recognition from the upper image received from camera 14, having less variety of the installed elements, is processed first to provide information for recognizing the robot cleaner's position. When the position is not precisely recognized, it is advisable that the front image from camera 13 is referenced for additional information.

The controller 18 recognizes the position of the robot cleaner 10 in reference to the stored image map by using the image map created when the robot cleaner 10 performs the cleaning after the image map is created. In other words, the controller 18 recognizes the current position of the robot cleaner 10 by comparing the current image input from the upper camera 14 alone, or from both the front camera 13 and the upper camera 14, with the stored image map. The controller 18 then controls the driving unit 15 to follow the line 22 corresponding to the target driving path from the recognized position, when the signal for externally commanding the cleaning is wirelessly input from outside or from the key input apparatus.

Here, the signal for commanding the cleaning may include an observation made through one or both of the cameras 13, 14 or from the cleaning program. The controller 18 calculates the driving error by using the current position recognized by the driving distance measured from the encoder and comparing the current photographed image from the cameras with the stored image map, and controls the driving unit 15 to track the target driving path by compensating for any error.

It has been described that the image map is directly created by the controller 18, and the position of the robot cleaner 10 can be recognized by the controller by using the created image map.

According to a third aspect of the present invention, the robot cleaning system may externally process the upper image map creation and position recognition of the robot cleaner 10 to reduce the operation load required for the creating of the image map of the robot cleaner 10 and for recognizing the position of the robot cleaner 10.

The robot cleaner 10 is constructed to wirelessly send the photographed image information to an external processor, such as central control unit 50 (FIG. 2), and to perform operations in accordance with the control signal transmitted from the external processor. Moreover, a remote controller 40 wirelessly controls the driving of the robot cleaner 10, recognizes the position of the robot cleaner 10, and creates the image map.

The remote controller 40 comprises a wireless relaying apparatus 41, an antenna 42 and a central control unit 50.

The wireless relaying apparatus 41 processes the wireless signal transmitted from the robot cleaner 10 and transmits the processed signal to the central control unit 50 through a wire. In addition, the wireless relaying apparatus 50 wirelessly sends the signal transmitted from the central control unit 50 to the robot cleaner 10 through antenna 42.

Figure 3:
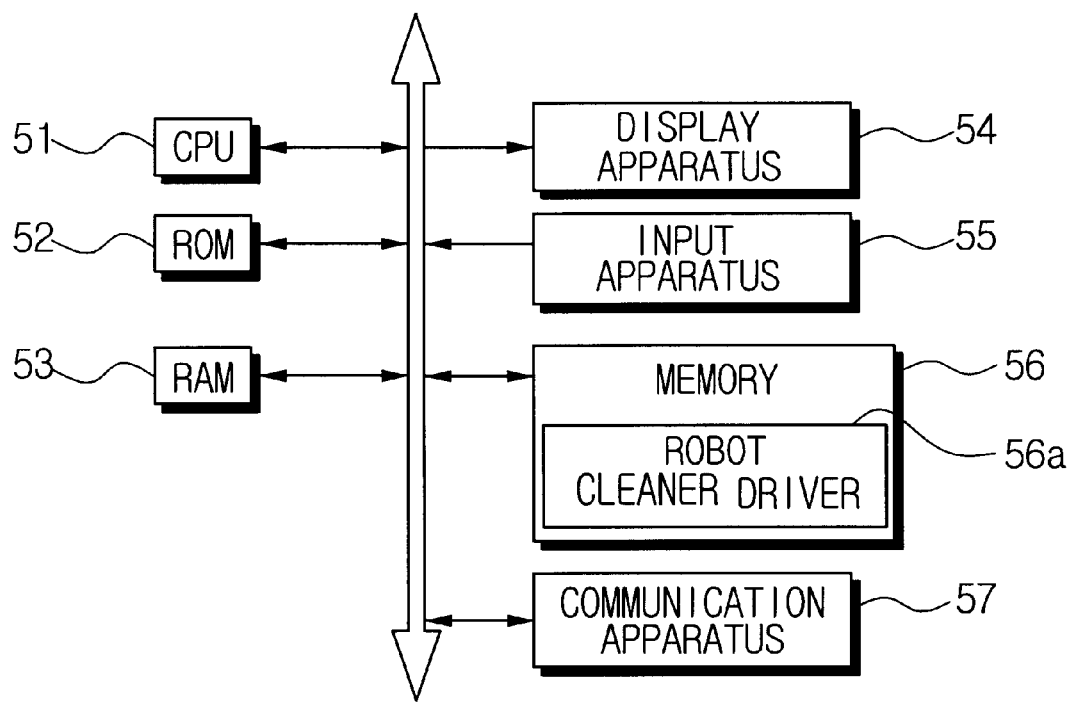
FIG. 3 is a schematic block diagram showing the central control unit of FIG. 2.

The central control unit 50 is established with a general computer, and one example of the central control unit 50 is shown in FIG. 3. Referring to FIG. 3, the central control unit 50 comprises a CPU (central process unit) 51, a ROM 52, a RAM 53, a display apparatus 54, an input apparatus 55, a memory 56, including a robot cleaner driver 56a, and a communication apparatus 57.

The robot cleaner driver 56a is used for controlling the robot cleaner 10 and for processing the signal transmitted from the robot cleaner 10.

The robot cleaner driver 56a provides a menu for setting up the control of the robot cleaner 10 through the display unit 54, and processes the menu choice selected by a user to be performed by the robot cleaner 10, when being operated. It is preferable that the menu includes the cleaning area map creation, the cleaning command, and the observation operation. Moreover, it is advisable that an image map creation command, a target area selection list, and a method for cleaning are provided as sub-selection menus.

In the case of the menu for creating the cleaning area map or the image map, it is preferable that the user can set up an update cycle at least once per week or once per month in regard to updating the status of the image map, when the robot cleaner 10 operates the cleaning process.

When a signal for creating the image map is input through the input apparatus 55 by the user or at the time of creating the predetermined image map, the robot cleaner driver 56a controls the robot cleaner 10 to receive the upper image, usually the ceiling image, of the entire cleaning area required for creating the image map, as described before. The robot cleaner driver 56a creates the image map by mapping the image transmitted by the robot cleaner 10, and stores the created image map into the memory 56. In this case, the controller 18 (FIG. 1) of the robot cleaner 10 controls the driving unit 15 in accordance with control information transmitted from the robot cleaner driver 56a through a wireless relaying apparatus 41 (FIG. 2), and thus the operation load in regard to creation of the image map is diminished significantly. In addition, the controller 18 transmits the upper image photographed during a regular cycle while the robot cleaner is driving in accordance with commands sent by the central control unit 50 through the wireless relaying apparatus 41. The robot cleaner driver 56a can create the image map by mapping the front image and the upper image, simultaneously.

Figure 7:
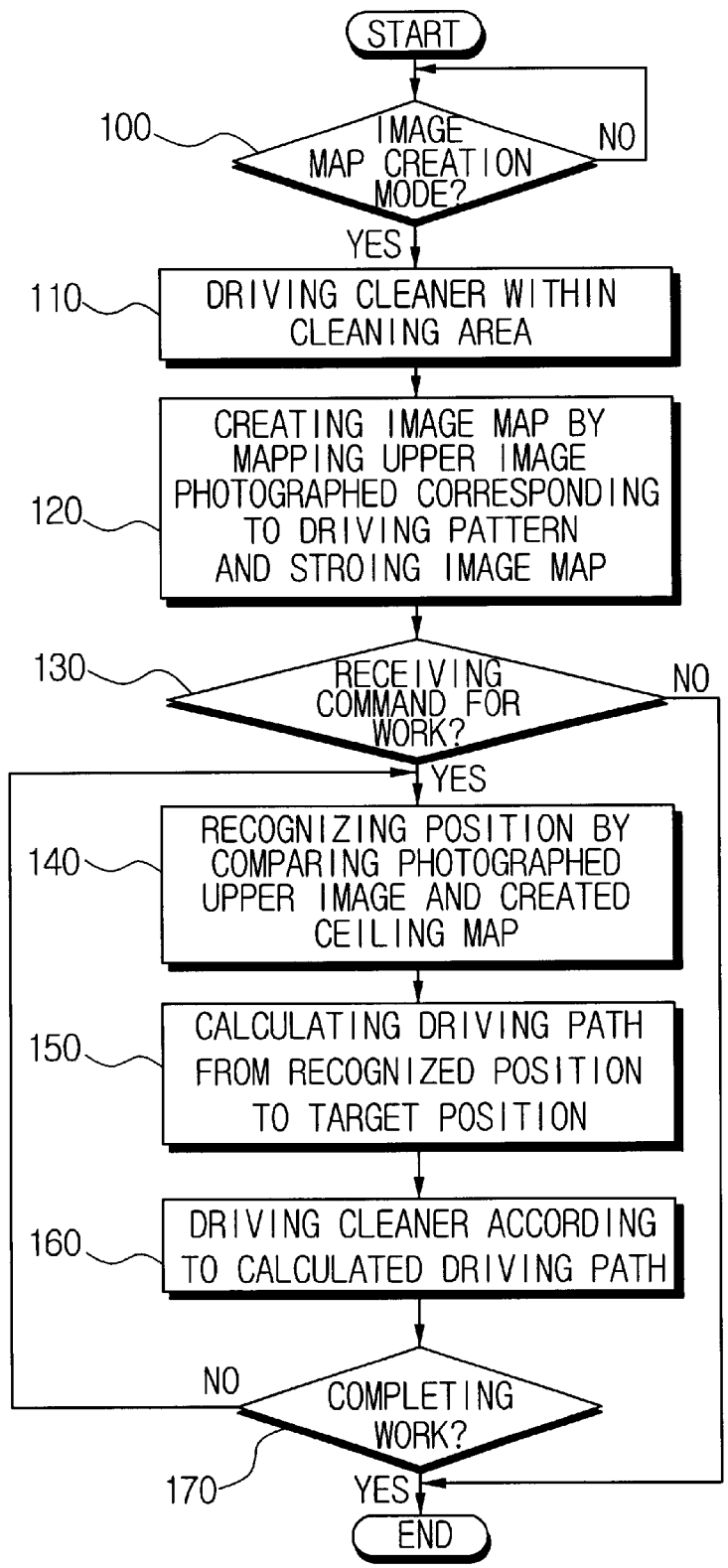
FIG. 7 is a flow chart diagram showing the control process of the robot cleaner according to one preferred embodiment of the present invention.

The position recognition method of the robot cleaner 10 operated by the above method will be described, referring to FIG. 7 for the method steps and to FIG. 1 for the hardware.

First the controller 18 (FIG. 1) judges whether to perform the mode for creating the image map, step 100.

When the mode for creating the image map is required or commanded, the controller 18 drives the robot cleaner 10 to photograph the entire upper image of the ceiling, step 10.

The controller 18 creates the image map by mapping the upper image and, if necessary, the front image, photographed by the cameras 13, 14 corresponding to the cleaning area, and stores the created image map into the memory 16 or 56, step 120.

After that, the controller 18 makes a determination of whether the command for cleaning is being transmitted, step 130.

When it is judged that the command for cleaning has been transmitted, the controller 18 recognizes the position of the robot cleaner 10 by comparing the upper image transmitted from the upper camera 14 with the stored image map, step 140. When the image map includes the information on the front image in the step 140, the current front image can be also used for the step of recognizing of the position of the robot cleaner 10.

Then, the controller 18 calculates the driving path from the recognized current position, as determined in step 140, for moving to the cleaning area or along the cleaning path corresponding to the transmitted command for cleaning, step 150.

Next, the controller 18 drives the robot cleaner 10 according to the calculated driving path, step 160.

Figure 8:
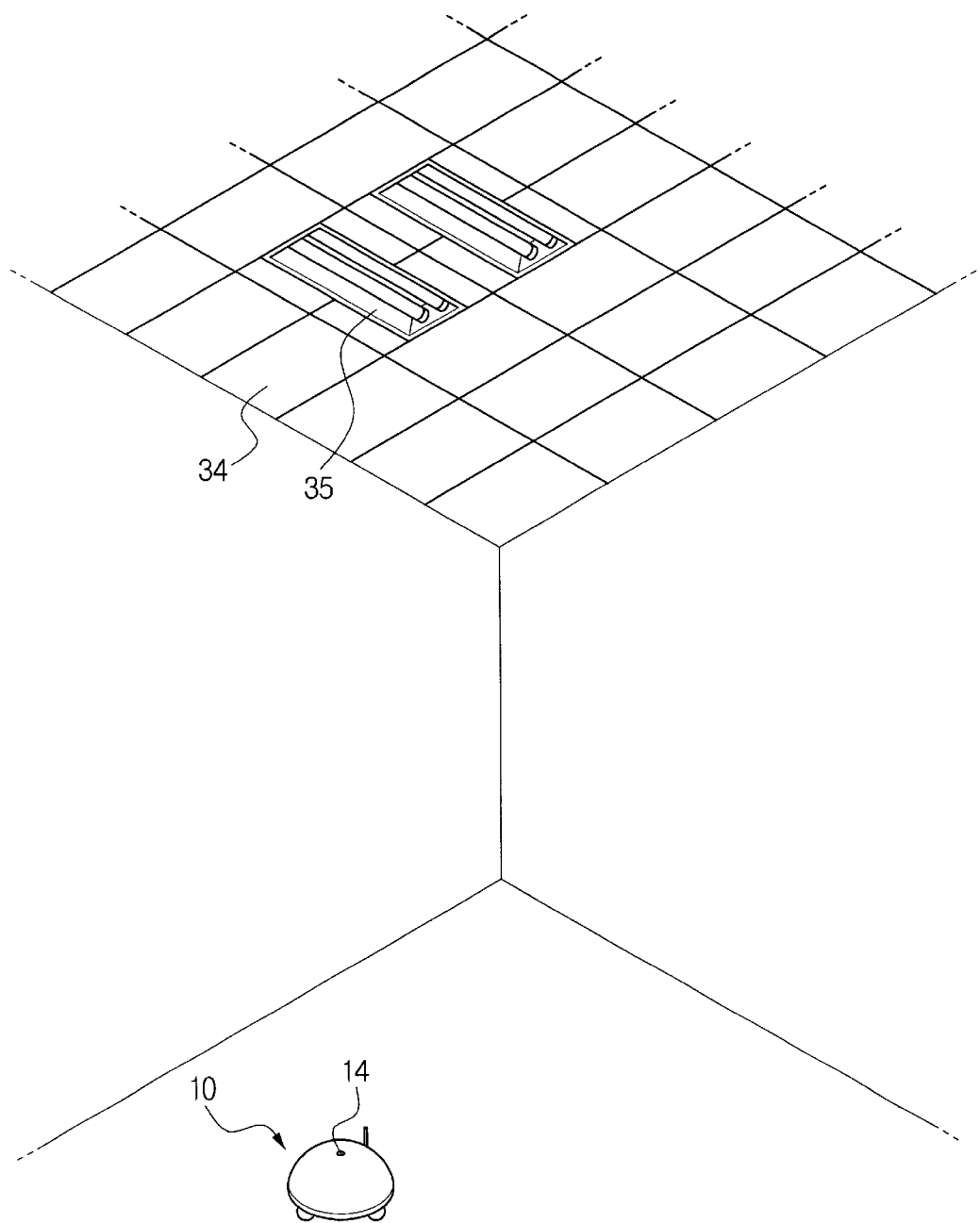
FIG. 8 is a perspective view showing another example of a possible room configuration.

After that, the controller 18 makes a determination whether the work command is completed, step 170. The work command here means the cleaning work that is performed driving the cleaning path or moving to the target position. If the work is not completed, steps 140 to 160 are repeated until the work is completed. Alternatively, according to a fourth preferred embodiment of the present invention, when the ceiling has an orthogonal outline, a method is adopted for driving the robot cleaner 10 so as to reduce the compensation process load in regard to the driving path by photographing the ceiling. For example, as shown in FIG. 8, when the ceiling is arrayed with rectangle plaster boards 34 or when a plurality of direct-light fluorescent lamps 35 are installed on the ceiling, the controller 18 or/and the remote controller 40 are established to compensate for any driving error by using the condition of the ceiling that provides the orthogonal outline defined by the edges of the plaster boards 34 or fluorescent lamps 35.

To achieve this, the controller 18 extracts any linear elements from the image photographed from the upper camera 14 while the robot cleaner 10 is driving, by using a well-known method for processing an image of a detected edge, and arranges for the driving track by using the extracted linear element information.

Preferably, the controller 18 compensates for any driving error detected with respect to a predetermined time or a predetermined distance from the encoder. After that, the controller 18 repeatedly compensates for the driving error by using the linear element of the image photographed from the upper camera. In other words, the controller 18 calculates the driving path error by detecting the driving path error with the encoder, and controls the driving unit 15 for allowing the robot cleaner 10 to return to a target driving path by compensating for the calculated error. After that, the controller 18 compensates for driving error by calculating the path deviation error of the robot cleaner 10 by using direction information of the linear elements extracted by analyzing the image data photographed from the upper camera 14.

The above method can be adapted to the robot cleaning system described above.

Here, the method for processing an image of the detected edge can adopt various methods such as a 'Sobel Algorithm,' or a 'Navatiark Babu Algorithm.'

Figure 9:
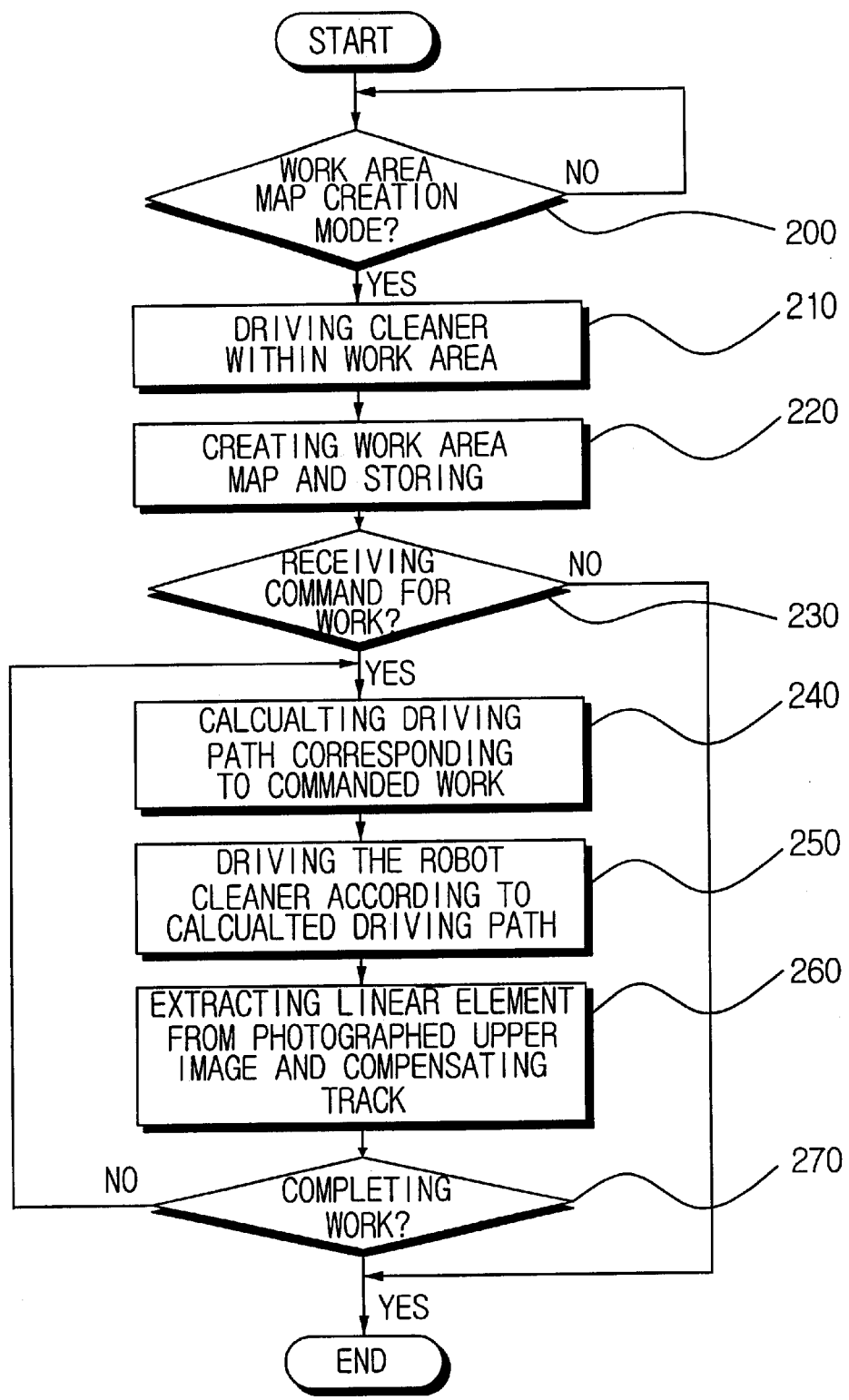
FIG. 9 is a flow chart showing the control process of the robot cleaner according to another preferred embodiment of the present invention.

The robot cleaner controlling process for compensating for the driving error by extracting the linear element from the upper image will be described in greater detail referring to FIG. 9 for the method steps and to FIGS. 1 and 8 for the hardware.

First, the controller 18 determines whether to perform the mode for creating the work or cleaning area map, step 200.

When the mode for creating the cleaning area map is required or commanded, the controller 18 drives the robot cleaner 10 within the cleaning area, step 210.

The driving pattern of the robot cleaner 10 in regard to the mode for creating the cleaning area map is the same as the example described above. First, the robot cleaner 10 is driven forward, and when a wall or an obstacle is detected by the obstacle detection sensor 12a, then the position is set up as the initial position. After that, the controller 18 controls the driving unit 15 to drive the robot cleaner 10 until the robot cleaner 10 returns to its initial position by driving along the outline of the room adjacent the wall. Next, the controller 18 drives the robot cleaner 10 within the area determined by the outline, as determined, along the driving line extending by incremental legs having, a predetermined interval between the legs. The controller 18 creates the cleaning area map by using the information on the obstacle or the driving path detected during the driving described above, and stores the cleaning area map, step 220. On the other hand, the cleaning area map may be created using the same method as the mode for creating the image map described above, and thereafter stored.

The controller 18 then determines whether the command for cleaning has been transmitted, step 230.

If the controller 18 determines that the command for cleaning has been transmitted, then the controller 18 calculates the driving path for moving to the commanded cleaning area or along the cleaning path corresponding to the transmitted command for cleaning, step 240.

Then, the controller 18 drives the robot cleaner 10 according to the calculated driving path, step 250.

The controller 18 extracts the linear element information from the image photographed from the upper camera 14 while the robot cleaner 10 is driving, and compensates for any driving error by using the extracted linear element information, step 260. Here, it is preferable that the process for analyzing the image photographed from the upper camera 14 is performed once every cycle set up so as to reduce the image process load.

Then, the controller 18 determines that the cleaning is completed by driving the robot cleaner 10 along the cleaning path according to the above process, step 270. If the cleaning is not completed, the controller 18 repeats the steps 240 to 260 until the robot cleaner 10 completes the cleaning, as shown by the loop in FIG. 9.

As described so far, the robot cleaner, the robot cleaning system, and the method for controlling the same according to the present invention can perform the commanded cleaning work more easily by reducing the driving error to the target position since the robot cleaner 10 can recognize the position more accurately by using the upper image having less variety of the installed elements. It is contemplated that unlike furniture, ceiling fixtures will not be moved as often.

The preferred embodiments of the present invention have been illustrated and described herein. However, the present invention is not limited to the preferred embodiments described here, and someone skilled in the art can modify the present invention without distorting the point of the present invention claimed in the following claims.

What is claimed is:

1. A robot cleaner for performing a cleaning operation by communicating wirelessly with an apparatus external to the robot cleaner, comprising:
   a driving unit for driving a plurality of wheels;
   an upper camera disposed on a main body in order to photograph an upper image perpendicular to a forward-looking direction parallel to the driving direction of the robot cleaner;
   a front camera disposed on the main body in order to photograph a front image viewed in the forward-looking direction of driving of the robot cleaner; and
   a controller for controlling the driving unit to allow the robot cleaner to drive within a cleaning area defined by a predetermined driving pattern, and for establishing a driving path along the predetermined driving pattern by analyzing the image photographed by the upper camera, wherein the controller creates an image map by three-dimensionally mapping the upper image photographed from the upper camera and the front image photographed by the front camera.

2. The robot cleaner of claim 1, wherein the controller controls the driving unit so as to drive within the area to be cleaned according to the predetermined driving pattern and further creates and stores an image map in regard to the upper area from the image photographed by the upper camera, and the controller recognizes the position of the robot cleaner by comparing the stored image map and a current image input from the upper camera so as to enable control of the driving unit corresponding to a target driving path from the recognized position.

3. The robot cleaner of claim 2, wherein the controller creates the image map when a signal for image map creation is transmitted.

4. The robot cleaner of claim 2, wherein the controller divides the image map into a plurality of small cells each having a predetermined size, and the controller determines a special feature disposed on the one or more of the divided small cells, and sets up the determined special feature as a standard coordinate point for recognizing the position of the robot cleaner.

5. The robot cleaner of claim 4, wherein the special feature includes at least one element selected from a group consisting of a bulb, a fire sensor, a fluorescent lamp, and a speaker.

6. The cleaner of claim 1, wherein the controller extracts a linear element from the image photographed from the upper camera while the robot cleaner is driving and compensates the driving path by using the extracted linear element.

7. A robot cleaning system including:
   a driving unit for driving a plurality of wheels;
   a robot cleaner having an upper camera disposed on a main body for photographing an upper image perpendicular to a driving direction;
   a front camera disposed on the main body in order to photograph a front image viewed in the forward-looking direction of driving of the robot cleaner; and
   a remote controller for wirelessly communicating with the robot cleaner,
   wherein the remote controller creates an image map by Three-dimensional mapping the upper image photographed from the upper camera and the front image photographed by the front camera and further controls the robot cleaner to drive within an area to be cleaned by a predetermined driving pattern, and compensates a driving path along the predetermined driving pattern by transmitting the image being photographed by the upper camera and analyzing the photographed image.

8. The robot cleaning system of claim 7, wherein the remote controller controls the robot cleaner to drive within the area to be cleaned defined by the predetermined driving pattern and creates the image map in regard to the upper area from the images photographed by the upper camera, and the remote controller further recognizes a position of the robot cleaner by comparing the image map and a current image transmitted from the robot cleaner after being photographed from the upper camera and the controller further controls a cleaning path of the robot cleaner to perform a target work from a recognized position, upon receiving a signal for image map creation.

9. The robot cleaning system of claim 8, wherein the remote controller creates the image map whenever a signal for image map creation is transmitted.

10. The robot cleaning system of claim 8, wherein the remote controller divides the image map into a plurality of small cells, each having a predetermined size, and then determines a special feature disposed on one or more of the divided small cells, and sets up the determined special feature as a standard image for recognizing the position of the robot cleaner.

11. The robot cleaning system of claim 10, wherein the special feature includes at least one element selected from the group consisting of a bulb, a fire sensor, a fluorescent lamp, and a speaker.

12. The robot cleaning system of claim 7, wherein the remote controller extracts a linear element from the image transmitted after being photographed from the upper camera and compensates the driving path by using the extracted linear element, when controlling the driving of the robot cleaner.

* * * * *